United States Patent
Kim

(10) Patent No.: US 9,190,015 B2
(45) Date of Patent: Nov. 17, 2015

(54) LIST SEARCHING METHOD AND PORTABLE DEVICE USING THE SAME

(71) Applicant: Samsung Electronics Co., Ltd, Gyeonggi-do (KR)

(72) Inventor: Dae Woong Kim, Suwon-si (KR)

(73) Assignee: SAMSUNG ELECTRONICS CO., LTD., Suwon-Si (KR)

( * ) Notice: Subject to any disclaimer, the term of this patent is extended or adjusted under 35 U.S.C. 154(b) by 104 days.

(21) Appl. No.: 14/160,194

(22) Filed: Jan. 21, 2014

(65) Prior Publication Data

US 2014/0132620 A1     May 15, 2014

Related U.S. Application Data

(63) Continuation of application No. 12/925,957, filed on Nov. 3, 2010, now Pat. No. 8,633,938.

(30) Foreign Application Priority Data

Nov. 19, 2009 (KR) ........................ 10-2009-0112043

(51) Int. Cl.
| | |
|---|---|
| G09G 5/00 | (2006.01) |
| G09G 5/02 | (2006.01) |
| G05B 11/01 | (2006.01) |
| G05B 15/00 | (2006.01) |
| G06F 3/00 | (2006.01) |
| G06F 3/048 | (2013.01) |
| H04N 11/00 | (2006.01) |
| H04N 5/46 | (2006.01) |
| H04N 9/74 | (2006.01) |

(52) U.S. Cl.
CPC .. *G09G 5/02* (2013.01); *G09G 5/00* (2013.01); *G09G 2320/066* (2013.01); *G09G 2340/14* (2013.01)

(58) Field of Classification Search
USPC ......... 345/581, 589, 593, 619, 629, 639, 690; 348/552, 557, 563, 586; 382/162, 274; 700/1, 17; 715/700, 835, 965
See application file for complete search history.

(56) References Cited

U.S. PATENT DOCUMENTS

| | | | |
|---|---|---|---|
| 2002/0057280 A1 | 5/2002 | Anabuki et al. | |
| 2003/0097475 A1* | 5/2003 | York | 709/246 |
| 2005/0039120 A1* | 2/2005 | Komagamine et al. | 715/517 |
| 2009/0027410 A1* | 1/2009 | Inuzuka | 345/555 |

FOREIGN PATENT DOCUMENTS

| | | |
|---|---|---|
| JP | 11 284944 | 10/1999 |
| JP | 2002 163670 | 6/2002 |

OTHER PUBLICATIONS

Korean Preliminary Rejection dated Aug. 12, 2015 in connection with Korean Application 10-2009-0112043; 11 pages.

* cited by examiner

*Primary Examiner* — Wesner Sajous

(57) ABSTRACT

A method and a portable device controls output of a display unit to display information accurately and clearly regardless of a background image. Disclosed is an arrangement for calculating a difference between an arbitrary expression value of an arbitrary screen configuration element to be displayed on a given area of the background image and an actual expression value of the given area of the background image. Each expression value includes at least one of a color and lightness. The arrangement automatically selects the expression value of the screen configuration element based on the calculation result. The screen configuration element is displayed at the given area of the background image based on the selected arbitrary expression value.

20 Claims, 6 Drawing Sheets

LIST SEARCHING METHOD AND PORTABLE DEVICE USING THE SAME

CROSS-REFERENCE TO RELATED APPLICATION (S) AND CLAIM OF PRIORITY

This application is a continuation of U.S. patent application Ser. No. 12/925,957, filed Nov. 3, 2010, entitled "LIST SEARCHING METHOD AND PORTABLE DEVICE USING THE SAME", which claims the benefit under 35 U.S.C. §119(a) to a Korean patent application filed in the Korean Intellectual Property Office on Nov. 19, 2009, and assigned Serial No. 10-2009-0112043, the entire disclosure of which is hereby incorporated by reference.

TECHNICAL FIELD OF THE INVENTION

The present invention relates to a portable device, and more particularly, to a method for controlling output of a display unit by automatically controlling an expression value capable of precisely expressing a screen configuration element including a specific text or an icon output on the display unit of the portable device, and a portable device supporting the same.

BACKGROUND OF THE INVENTION

A portable device is a terminal that supports various functions based on mobility. Portable devices have been used widely to their convenience of a use and portability. The portable device provides various input schemes for providing user functions. For example, a conventional portable device supports input of given characters or numerals through a key pad mechanically disposed at one side thereof. Further, a size of the portable device can be reduced to improve portability. To secure the suitable size of a display unit in a small portable device, a key pad is removed and a touch screen that includes a touch panel is provided on the display unit.

A portable device outputs various screen configuration elements supporting various user functions recognized by a user on the display unit. Such a screen configuration element can be output in a specific form, such as a text, icon, or image form based on a background image. The screen configuration element is output to have a constant expression value. However, there is a high possibility that a screen configuration element may be obscured by the background image, such that the screen configuration element cannot effectively display information.

SUMMARY OF THE INVENTION

To address the above-discussed deficiencies of the prior art, it is a primary object to provide a device and a method for controlling output of a display unit that may construct a screen configuration element in a form capable of displaying information accurately and clearly regardless of a background image, and a portable device supporting the same.

In accordance with an aspect of the present invention, a method of controlling output of a display unit includes outputting a background image. A difference between an arbitrary expression value including at least one of a color and a lightness of an arbitrary screen configuration element to be output at a given area on which the background image is output and a corresponding expression value of the given area of the background image is calculated. The screen configuration element is displayed at the given area of the background image based on the difference of the expression values according to the calculation result.

In accordance with another aspect of the present invention, a portable device supporting output control of a display unit includes the display unit for outputting a background image and an arbitrary screen configuration element on the background image. A controller calculates a difference between an expression value including at least one of a color or a lightness of an arbitrary screen configuration element to be output at a given area on which the background image is output and a corresponding expression value of the given area of the background image, and controls output of the screen configuration element at the given area of the background image based on the difference of the expression values according to the calculation result.

In a method for controlling output of a display unit and a portable device supporting the same, the portable device may output a screen configuration element capable of clearly transferring information.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION OF THE INVENTION

FIGS. 1 through 6, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged portable device. Detailed descriptions of well-known functions and structures incorporated herein may be omitted to avoid obscuring the subject matter of the present invention.

In the present disclosure, a text will be described as a representative example of a screen configuration element. However, the screen configuration element is not limited to the text of the representative example. The screen configuration element may include an icon or an image.

Figure 1:
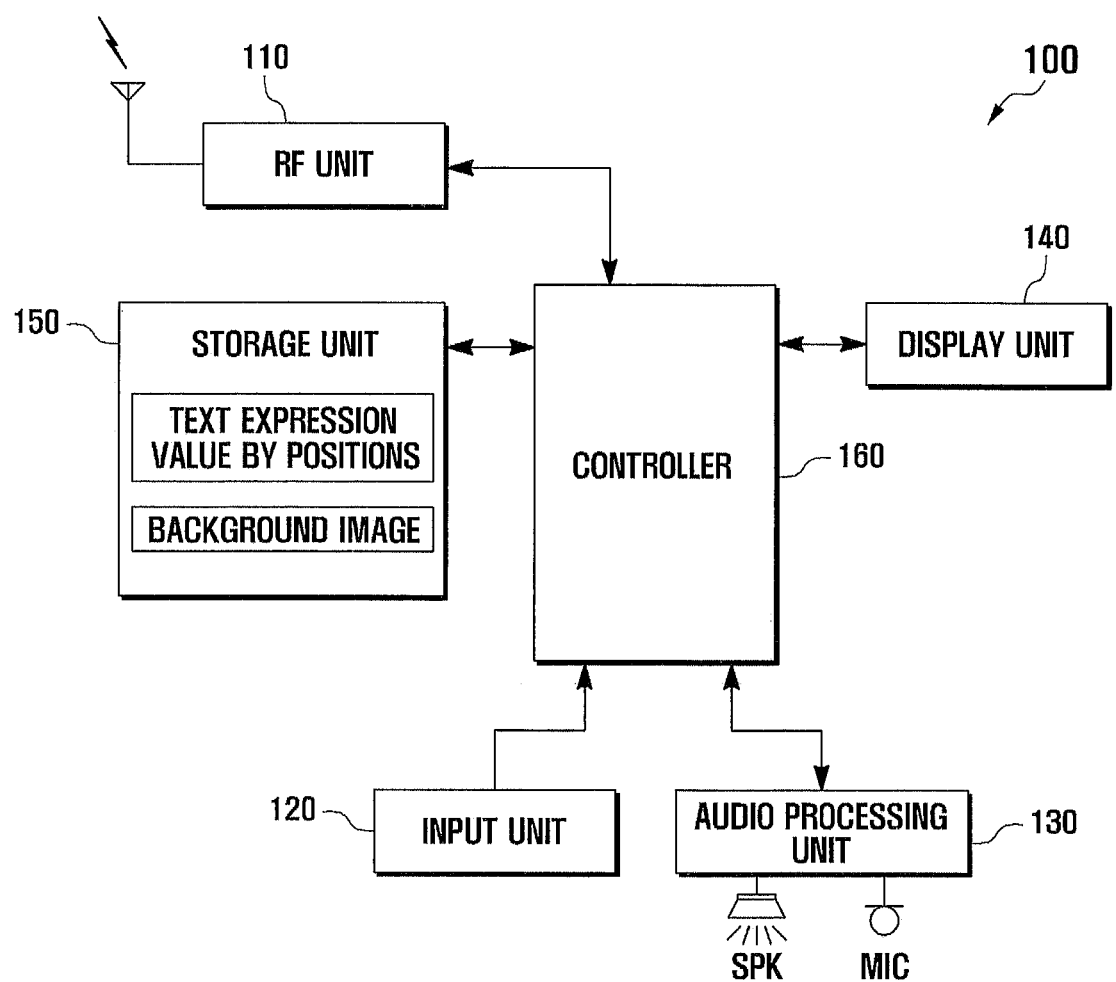
FIG. 1 illustrates a portable device according to an embodiment of the present invention.

FIG. 1 illustrates a portable device that supports an automatic expression value selection function for an exact screen configuration element transfer function according to an embodiment of the present invention.

Referring to FIG. 1, a portable device 100 of the present invention includes a radio frequency (RF) unit 110, an input unit 120, an audio processing unit 130, a display unit 140, a storage unit 150, and a controller 160.

The portable device 100, according to an embodiment of the present invention, checks a background image and a text output on the display unit 140, selects a text expression value capable of displaying the most clear indication on a specific background image, and controls the display of a corresponding text on the background image. Here, the expression value may include at least one of color and lightness. Hereinafter, functions and roles of respective structures of the portable device 100 will be described in detail.

The RF unit 110 forms a communication channel for a voice call and a communication channel for transmitting images, videos, or data under the control of the controller 160. Namely, the RF unit 110 forms a voice call channel, a data communication channel, or an image call channel between mobile communication systems. To do this, the RF unit 110 may include an RF transmitter for up-converting a frequency of a transmitted signal and amplifying the signal, and an RF receiver for low-noise-amplifying a received signal and down-converting the signal. The RF unit 100 may support various user functions based on a mobile communication service of the portable device 100. For example, the RF unit 110 may provide various user functions such as a voice call connection function, a video call connection function, a short message service function, a multimedia message service function, a web access function, and a file download function based on the communication channel formation of a mobile communication system. Meanwhile, input or output of numerals or characters is used to operate the RF unit 110. For example, the RF unit 100 uses a telephone number of a partner terminal for voice call connection. The portable device 100 outputs numerals or characters corresponding to the telephone number. The portable device 100 may determine a text expression value on a specific background image capable of clearly recognizing output characters or numerals and control the display to display a text to which a corresponding expression value is applied. The RF unit 110 allows the portable device 100 to have a mobile communication function. If the portable device 100 does not have the mobile communication function, the RF unit can be omitted.

The input unit 120 includes a plurality of input keys and function keys for receiving input of numeral or character information and setting all types of functions. The function keys may include arrow keys, side keys, and hot keys set to execute specific functions. The input unit 120 can be configured by a QWERTY key pad, a 3*4 key pad, or a 4*3 key pad with a plurality of keys. Further, when the portable device 100 uses a touch screen, the input unit 120 may be configured by a QWERTY key map, a 3*4 key map, a 4*3 key map, a menu map, or a soft key map. When the portable device 100 uses a full touch screen, the input unit 120 can be configured by the touch screen and a side key provided at one side in an embodiment does not include a separate key pad. The input unit 120 of the present invention may generate an input signal for outputting a screen using a specific image as a background image according to a user request, and transfer the generated input signal to the controller 160. Moreover, the input unit 120 may generate an input signal for converting a background image and an input signal for entering texts according to a user's input.

The audio processing unit 130 includes a speaker (SPK) for outputting transmitted and received audio data at the time of call, audio data included in a received message, and audio data for playing an audio file stored in the storage unit 150. The audio processing unit 130 may also include a microphone (MIC) for collecting a user's voices or other audio signals at the time of call. The audio processing unit 130 may output a sound effect corresponding to a specific text when the specific text is input. In addition, when a text output on a specific screen changes, the audio processing unit may output an alarm corresponding thereto. For example, when a text corresponding to a digital clock is output on the display unit 140 and a time indicated by the digital clock elapses, the audio processing unit 130 may output a time alarm.

The display unit 140 displays input information from a user and information provided to the user as well as all types of menus or interfaces of the portable device 100. That is, the display unit 140 may provide various screens, such an idle screen, a menu screen, a message write screen, and a call screen. The display unit 140 can be configured by a Liquid Crystal Display (LCD) or an Organic Light Emitted Diode (OLED). In particular, the display unit 140 of the present invention may include a background image constituting a specific screen, and a screen configuration element such as a text, an icon, or an image output on the background image. A specific expression value may be automatically determined according to an expression value of a background image as the text expression value output on the display unit 140. Determination of an expression value of the screen configuration element will be described in detail with reference to the following drawings and equations.

The storage unit 150 may store not only an application program necessary for a function, but also a key map, a menu map, or a soft key map according to a user request for supporting an input function when the display unit 140 is configured by a touch screen. Here, a key map and a menu map can come in various forms. Namely, the key map may become a keyboard map, a 3*4 key map, a QWERTY key map, or a control key map for controlling an operation of a currently activated application program. The menu map may also become a menu map for controlling an operation of a currently activated application program or a menu map that includes various menus provided by the portable device 100. The storage unit may largely include a program area and a data area.

The program area may store an operating system (OS) for booting and operation of respective constructions, and application programs for playing various files (e.g. an application program that supports a call function according to the functional support of the portable device 100, a web browser for accessing an Internet server, an MP3 application program for playing other sound sources, an image output application program for displaying photographs, and a video play application program). In some embodiments of the present invention, the program area includes an automatic expression value selection program.

The automatic expression value selection program may include a routine for extracting an output area of a text when a screen configuration element displayed on a background image is the text, a routine for extracting a background image of an output area of a text, and a routine for selecting a specific text expression value based on a background on which a text is output. The routine for selecting a specific text expression value may include a subroutine that detects an expression value that includes at least one of a color value or lightness value of a background image of a given area on which a text is output; a subroutine that calculates differences between expression values of respective pixels constituting a background image at a given area on which a text is output and corresponding an arbitrary expression value, and obtains and sums respective squares of the differences; a subroutine that compares a difference between an expression value corresponding to a background image and an arbitrary expression value with a preset reference value, selects one of two values, obtains square roots of the selected values, and sums the square roots of the selected values; a subroutine that selects a type of a text to be output on a corresponding area and the output number of the text; a subroutine that detects an edge probability of a text and applies the edge probability to a selected expression value; and a subroutine that selects a specific text expression value using an arbitrary expression value selected according to results of the sub routines. The text of each routine can be substituted by an icon or an image.

The data area is an area for storing data created according to a use of the portable device 100, which may store phone book information, at least one icon according to a widget function, and various contents. When a touch panel is manufactured to be included in the display unit 140, the data area may store a user input such as a touch event input through the display unit 140. In particular, the data area of the present invention may store pixel values of background images with respect to a given area on which a text will be output, and a pixel value of a text to be displayed on a corresponding area. Moreover, the data area may store at least one preset arbitrary expression value including at least one of a reference optional color value and a reference optional lightness value for selecting an expression value of a text, and a reference value set such that a difference between an expression value of a background image at a given area on which a text is output and an expression value of a text does not exceed a given value. Here, the reference value includes at least one of a preset color value and a preset lightness value to determine the expression value. Respective values stored in the data area can be used by the controller 160 at the time of arithmetic process to designate an expression value of a text.

The controller 160 controls power supply to respective components of the portable device 100 that support execution of an initializing procedure. When the initializing procedure is terminated, the controller 160 may control the respective components to support an automatic expression value selection function according to an embodiment of the present invention. To do this, the controller 160 may include a structure as illustrated in FIG. 2.

Figure 2:
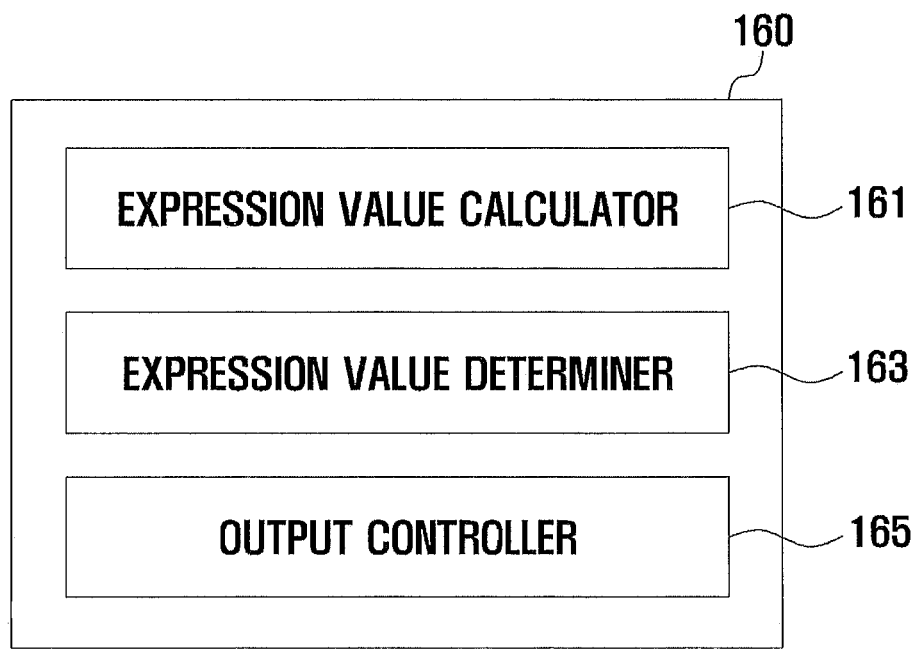
FIG. 2 illustrates a controller in detail according to an embodiment of the present invention.

FIG. 2 illustrates a controller 160 for supporting an automatic expression value selection function in detail according to an embodiment of the present invention.

Referring to FIG. 1 and FIG. 2, the controller 160 of the present invention may include an expression value calculator 161, an expression value determiner 163, and an output controller 165.

The expression value calculator 161 collects text output position information with respect to an output position of a specific text and background image information, and calculates an expression value of a text to be output on a corresponding text output position based on the text output position information and the background image information. An output position of a text on the display unit 140 can be fixed. For example, when a digital clock provides a time by a digital scheme, an output position of the text may be fixed. In an embodiment that includes a screen with various menu items, a screen for outputting a help file, or a specific screen such as a previous output screen supported by the portable device 100, an output position and a form of a text on a corresponding screen can be fixed. While texts such as numerals or characters entered by a user are flexibly displayed, the output screen area of the texts is fixed. As illustrated previously, various texts supported by the portable device 100 may or may not be displayed on a current screen according to an input signal, but respective output positions and areas of the texts are fixed. Accordingly, the expression value calculator 161 may extract the output position information of texts from various screens supported by the portable device 100. Furthermore, the expression value calculator 161 may acquire an expression value including at least one of color information and lightness information by positions constituting each background image from various background images stored in the storage unit 150. In an embodiment, the expression value calculator 161 may check an output position of a text from expression value information of entire background images to acquire only the expression value information of the background image in a corresponding position.

When the expression value calculator 161 acquires text output position information, a type of a text, and expression value information of a background image. The expression value calculator 161 performs an operation for determining an expression value of the text in a corresponding position based on the acquired information. Such an operation can be performed in a process prior to displaying a text. Accordingly, the expression value calculator 161 may determine an expression value of a text that is to be subsequently output on a specific position to reduce an operation load of the portable device 100. The expression value of the text by positions calculated by the expression value calculator 161 can be stored in the storage unit 150. The text output on a background image has been described in the embodiment of the present invention. However, the present invention is not limited thereto. For example, the text can be substituted by an icon or an image that has a given area. A detailed explanation thereof will be given below. In addition, an operation for acquiring an expression value of a text by the expression value calculator 161 will be explained in detail with reference to the accompanying drawings.

The expression value determiner 163 checks background image information that is currently displayed on the display unit 140 of the portable device 100, and checks a currently activated application program. In addition, the expression value determiner 163 checks a screen to be displayed by an application program and a background image included on the screen. For example, when the application program displays an idle screen, the expression value determiner 163 may acquire background image information constituting an idle screen from information stored in the storage unit 150. Moreover, the expression value determiner 163 checks text information set to be output at the time of output of the idle screen.

In detail, a user may construct an image to meet the user's taste and set various texts to use them conveniently. Accordingly, the portable device 100 stores various set information set by the user in the storage unit 150, checks corresponding information at the time of output of an idle screen, and outputs various images, icons, texts, and background images corresponding to the checked information. At this time, expression value determiner 163 checks the user set information stored in the storage unit 150, and then checks background image and text information. The expression value determiner 163 may determine an expression value of a text by referring a text expression value by positions stored in the storage unit 150. As illustrated earlier, the expression value determiner 163 previously performs an operation to determine various background images and expression values of texts output at a specific position of the background image, and stores the operation results in the storage unit 150 as an expression value by positions. Accordingly, the expression value determiner 163 may rapidly determine an expression value of a text with respect to a screen changed according to output of an idle screen or another application program by referring a text expression value by positions.

The output controller 165 controls output of a corresponding text on the display unit 140 based on the expression value of a text determined by the expression value determiner 163. The output controller 165 checks an expression value of a text output at a specific position by referring an expression value of a text by positions, and controls output of a text with a corresponding expression value. Furthermore, when a type of a text is changed at a specific position, the output controller 165 controls output of the changed text that includes a preset expression value. Because a weight can be applied to a type of entire texts provided by the portable device, specific texts output on a specific position at the time of determining the expression value of a text may have the same expression value to which a weight is applied. Accordingly, the output controller 165 may control output of texts formed at a specific position based on a preset expression value.

The calculation of the expression value will now be described in detailed with reference to the accompanying drawings and following Equations.

Figure 3:
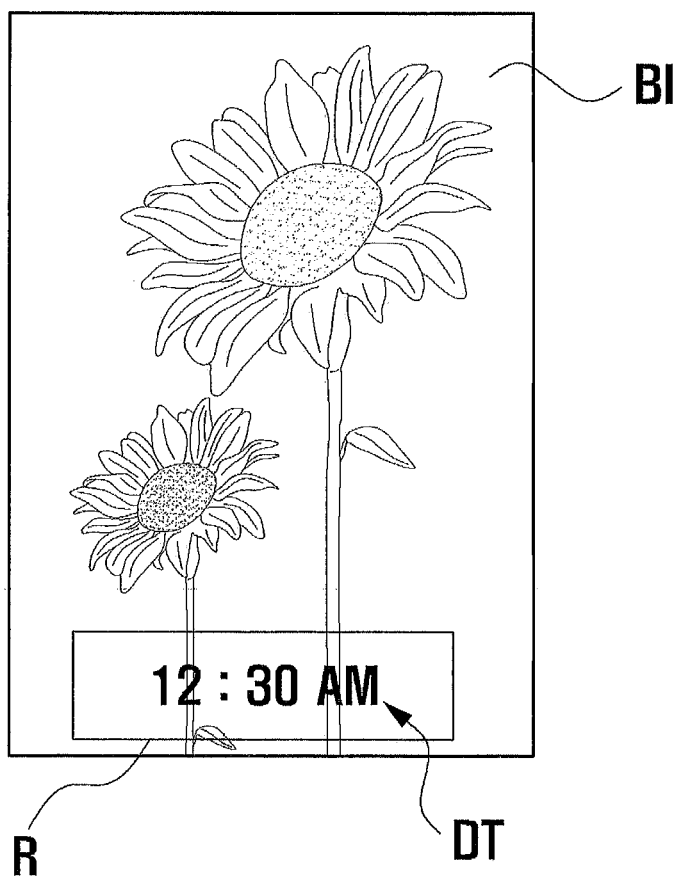
FIG. 3 illustrates a process for automatically selecting an expression value of a screen configuration element according to an embodiment of the present invention.

FIG. 3 illustrates a user interface for explaining determination of an expression value according to an embodiment of the present invention.

Referring to FIG. 3, the controller 160 controls the display unit 140 to display a background image BI that includes a given pattern and color, and a screen configuration element, such as a digital clock DT output on the background image BI. The background image BI can be determined by selecting an image stored in the storage unit 150 by a user. Also, the background image BI may be modified by the user. When a specific application program is activated according to a user's setting, the controller 160 of the portable device 100 may check a background image BI linked with a corresponding application program and control the display unit 140 to display the background image BI by constructing the checked background image BI with a screen according to activation of a corresponding application program. For example, the user may link and set a specific background image BI by functions such as a call receiving function, a call transmitting function, a message write function, a message transmitting function, and a menu function. Accordingly, the controller 160 checks link information when activating the respective functions and controls the display unit 140 to display the linked background image. Accordingly, a flower image, as illustrated in FIG. 3, is linked with a background image BI of an idle screen, and the controller 160 may control the display unit 140 to display the linked flower image as the background image BI upon activation of the idle screen.

Meanwhile, the controller 160 may control the display unit 140 to output screen configuration element information, such as a digital clock DT, at the time of outputting the idle screen on a preset location thereof. At this time, the controller 160 may control the background image BI to be displayed at a lower layer, and the digital clock DT to be displayed at an upper layer. To do this, the controller 160 may check an output position of the digital clock DT, check an expression value of a background image at a corresponding position, and control indication of the digital clock DT by selecting an expression value such that a text constituting the digital clock DT can be displayed more clearly at the corresponding position on the screen. When a background image BI of an idle screen is determined and a digital clock DT is determined as a screen configuration element, the calculation procedure acquires an expression value of a background image BI with respect to an output position of the digital clock DT through a previous process, and applies various arbitrary expression values to the digital clock DT, and automatically sets an optional value with the greatest sum of respective squares of differences of expression values. Equation 1 can be used to obtain an arbitrary expression value.

$$\hat{C} = \overset{\text{argmax}}{C} \frac{1}{|R|} \sum_{p \in R} \|I(X_p) - C\|_F^2 \quad \text{[Equation 1]}$$

In Equation 1, $\hat{C}$ represents a value with the greatest color difference in an output area of the digital clock DT, |R| represents a given area with a text included in the digital clock DT, and p represents an optional pixel of a corresponding given area, $X_p$ represents each pixel coordinate of a given area R, $I(X_p)$) represents color information of corresponding pixels, and C represents an arbitrary expression value of the digital clock DT. Here, when a color of a text is implemented by RGB, the arbitrary expression value C may become a value of 1×3 matrix. The arbitrary expression value C may become an expression value including at least one of an optional color or lightness provided from the portable device 100. Hereinafter, a color value is described as a representative example of expression values. F represents a Frobenius Norm operation.

As a result, Equation 1 subtracts an optional color value C of the digital clock DT from color information of respective pixels in a given area R on which the digital clock DT is output, obtaining a square of the result, and calculates the greatest value among values obtained by dividing a total sum in the given area R from value |R|. The optional color value C is an arbitrary expression value which may become various colors provided by the portable device.

Using Equation 1, the controller 160 can calculate for the background image BI the greatest color difference value from an output area of the digital clock DT being a screen configuration element, and detect an arbitrary expression value C with the greatest color difference. Accordingly, when a corresponding background image BI is output on the display unit 140, the controller 160 may control output of an expression value of the digital clock DT based on the detected optional value C.

As a result, the controller 160 of the present invention may determine respective expression values according to positions in which screen configuration elements are output on the background image BT, to thereby control output of a text that includes the background image BI and a color with the greatest color difference although the screen configuration elements are output at a certain position. Consequently, the present invention may clearly display information that a screen configuration element wants to provide.

Meanwhile, although a screen configuration element output on the display unit 140 is output on the background image BI to have a specific color, because contrasts between a given area of the screen configuration element and background images BI are not uniform, a part of the screen configuration element can be assimilated with the background image BI. A method for selecting a more suitable expression value in this circumference will be described with reference to FIG. 4.

Figure 4:
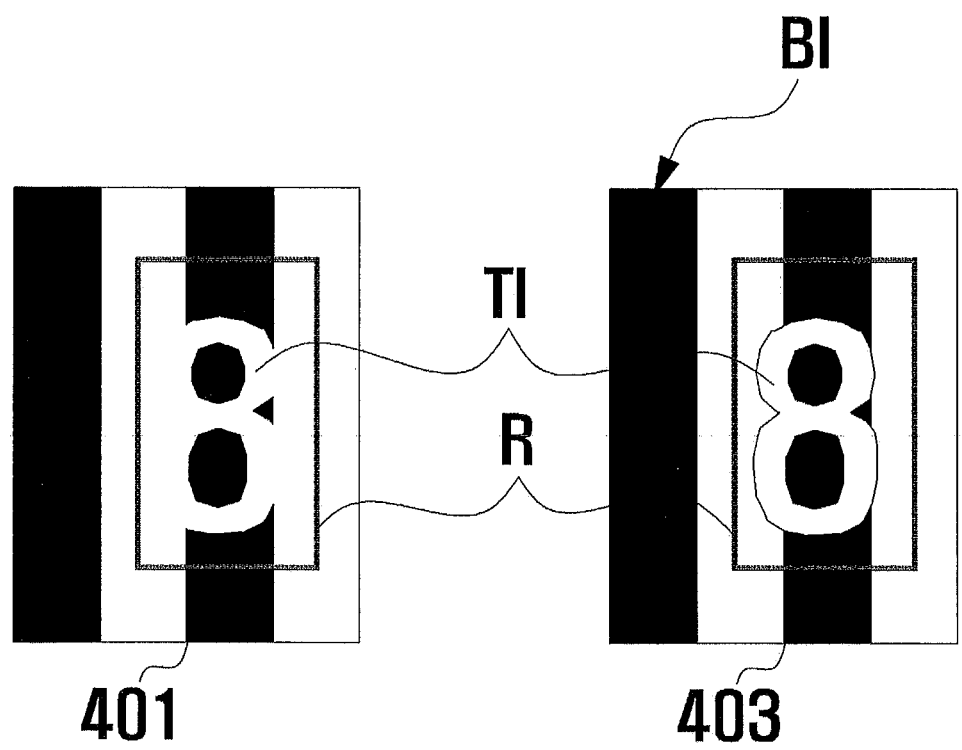
FIG. 4 illustrates a process for automatically selecting an expression value of a screen configuration element according to an embodiment of the present invention.

FIG. 4 illustrates a process for automatically selecting an expression value of a screen configuration element a according to an embodiment of the present invention.

Referring to FIG. 1 and FIG. 4, a screen 401 output on the display unit 140 indicates a state that a text TI corresponding to a screen configuration element is assimilated with a partial area of the background image BT. Namely, the screen 401 indicates a sample scenario in which the a background image BI has a stripe pattern, respective colors of the stripe pattern differ from each other, and a color of one of the stripes is similar to that of the text TI. For example, the display unit 140 may output a background image BI that alternates a black stripe and a white stripe, and a text TI with a white color on a corresponding background image BI. Here, when the text TI is located at a stripe boundary of the background image BI, a partial area of the text may be positioned on a white stripe, and a remaining area of the text TI may be positioned on a black stripe. Accordingly, the white text TI cannot express the shape over a white stripe area, but can express a clearly discriminated shape at a black stripe area.

To reduce such errors, the present invention may select and apply a corresponding text expression value and a color with a color difference value greater than a constant value. This is described with reference to following Equations 2 and 3.

$$\hat{C} = \underset{c}{\operatorname{argmax}} \frac{1}{|R|} \sum_{p \in R} P(|I(X_p) - C|, k) \qquad \text{[Equation 2]}$$

$$P(x, k) = \begin{cases} x^2, & |x| < k \\ k^2, & |x| \geq k \end{cases} \qquad \text{[Equation 3]}$$

In Equation 2, represents a value with the greatest color difference from a background image (BI) at an output area of the text TI, |R| represents a given area R with the text TI, and P represents an optional pixel of the given area R. $X_p$ represents each pixel coordinates in a given area R, $I(X_p)$ represents color information of corresponding pixels, and C represents an arbitrary expression value. A function P in Equation 3 is a function that outputs $x^2$ when an absolute value of x is less than k, and outputs $k^2$ when the absolute value of x is equal to or greater than k. Accordingly, Equations 2 and 3 may prevent the occurrence of a color difference value becoming less than a first reference value or greater than a second reference value by comparing the absolute value of x with a preset reference value k. As a result, Equation 2 compares absolute values of differences between expression values of respective pixels at a given output area of a text and the preset reference value, selectively obtains squares of differences of the expression values when the expression value difference is less than the preset reference value, and selectively obtains a square of the reference value when the expression value difference is equal to or greater than the preset reference value. Moreover, Equation 2 performs a selective multiplying operation with respect to the given area and divides a sum of comparison results with respect to respective pixels at the given area by an area value of the given area to obtain the greatest value. Accordingly, the controller 160 can control selection of an arbitrary expression value applied when the greatest value is obtained by Equation 2 as an expression value of a text.

The text TI on the screen 401 has very large color difference value on a background image BI of a black stripe, but there is a little color difference value on a background image BI of a white stripe. Accordingly, when an operation with respect to an output area of a text TI is performed using Equation 1, an expression value of the text TI is selected with a white color. Consequently, like the screen 401, a text TI of a given part can be assimilated with the background image BI.

Accordingly, the controller 160 sets to apply a preset reference value k to Equations 2 and 3 when a difference between an expression value of a specific pixel and an arbitrary expression value is less than a first reference value (e.g. −k) or greater than a second reference value (e.g. k), such that an expression value of a text TI has an expression value of a text with gray color but not white like the screen 403.

As described above, the controller 160, according to an embodiment of the present invention, may apply a constant value instead of a corresponding difference when an absolute value of a difference between an expression value of a text and an expression value of a background image is equal to or greater than the constant value in consideration of diversity of a background image BI to relatively increase importance of a small color difference value, resulting in selecting an expression value in which a text TI is not assimilated with the background image BI.

Meanwhile, a weight is applied to a given output area of a text at the time of supporting an automatic selection function of an expression value, according to an embodiment of the present invention, to output a more clear text. This will now be described in detail with reference to FIG. 5.

Figure 5:
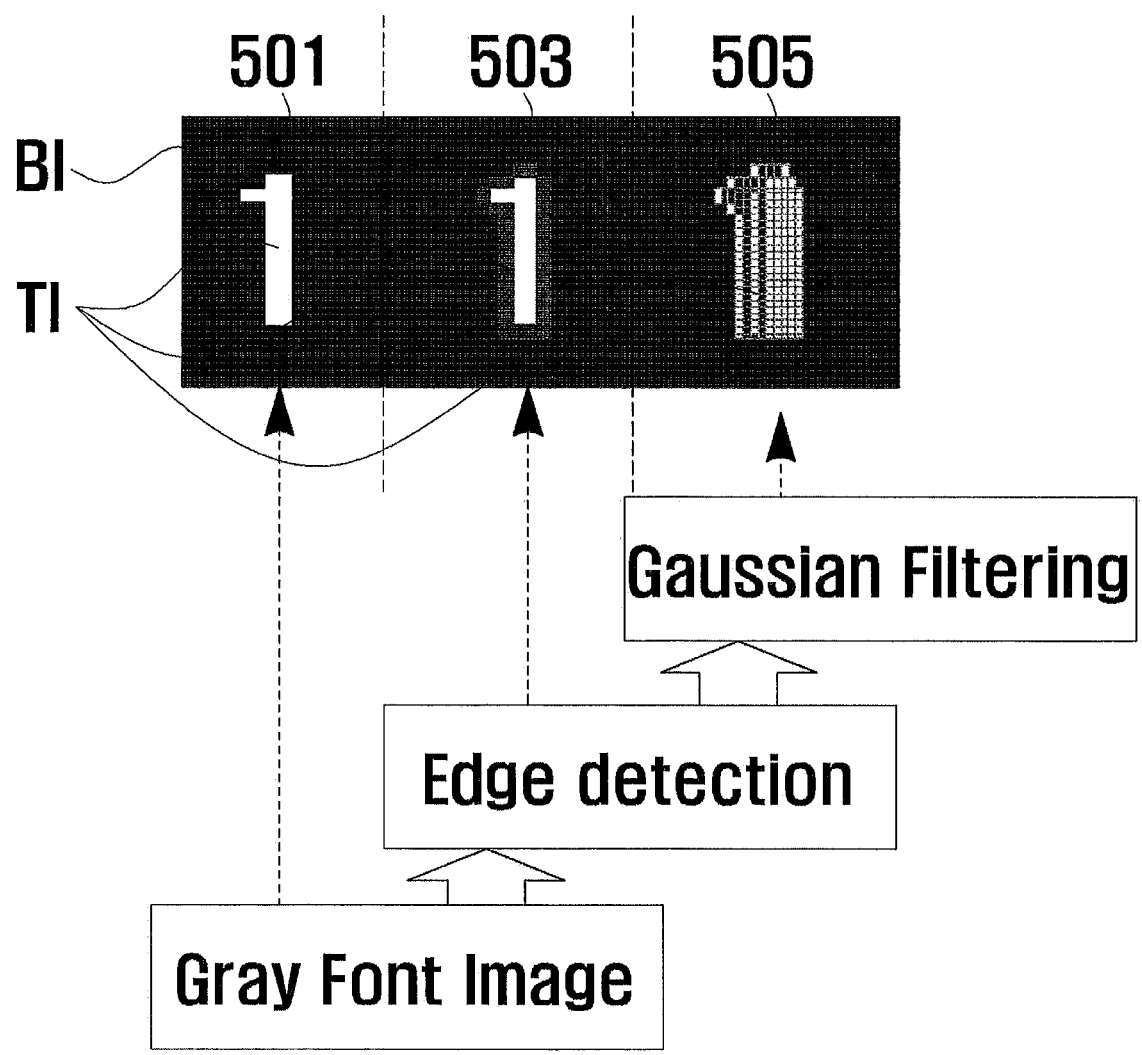
FIG. 5 illustrates a process for automatically selecting an expression value of a screen configuration element according to an embodiment of the present invention.

FIG. 5 illustrates a part applying a weight when an expression value is automatically selected according to an embodiment of the present invention.

Referring to FIG. 1 and FIG. 5, a text TI may be output with a gray font image as illustrated with a reference numeral 501 on the display unit 140 according to a form of a background image BI. The controller 160 may perform edge detection with respect to a specific text TI output at a given area of the display unit 140 to detect a text area 503. The controller 160 may also perform Gaussian filtering with respect to the edge detected text area to extend a range of an area on which the edge detected text area can be output. As a result, the controller 160 may extract range information with respect to given areas that a specific text can be output on the display unit 140.

In the meantime, the controller 160 may extract range information of given areas as described above with respect to all types of a text that can be output at a given area of the display unit 140. For example, as shown in FIG. 5, when a numeral "1" is output, the controller 160 may extract range information of given areas. Further, when other numerals such as "2", "3", or "4" are output, the controller 160 may extract range information due to edge detection and Gaussian filtering. The controller 160 may extract given range information of a text output with respect to characters, special characters and drawings through edge detection and Gaussian filtering. Moreover, the controller 160 may detect a frequency of a text output at a corresponding area. For example, the controller 160 may detect an output frequency of "1" and an output frequency of "2" achieved at a corresponding area. In addition, the controller 160 may apply a weight according to the frequency and range information by the foregoing filtering to perform an operation for automatically selecting an expression value as expressed by following Equations 4 and 5.

$$\hat{C} = \underset{c}{\operatorname{argmax}} \frac{1}{|R|} \sum_{p \in R} b(X_p) P(|I(X_p) - C|, k) \quad \text{[Equation 4]}$$

$$b(X_p) = \frac{1}{|T|} \sum_{t \in T} N(t) B(t(X_p)) \quad \text{[Equation 5]}$$

Because Equation 4 is identical with Equation 2 except for $b(X_p)$ of Equation 5, a detailed explanation is omitted. The $b(X_p)$ of Equation 5 is a probability that a specific pixel coordinate $X_p$ is an edge of a text, N(t) represents a use frequency of t, T is a type of the text, and t represents a specific text. $B(t(X_p))$ represents the probability that a corresponding $X_p$ is an edge area of t when the t is drawn at a specific pixel coordinate $X_p$ location. For example, respective pixels constituting a given area can construct given text values, for example, numerals from "0" to "9", characters "AM" and "PM" at an given output area of a digital clock according to a variation of the digital clock. At this time, it is assumed that texts displayed at the given output area of the digital clock are texts to discriminate hour, minute, and AM/PM. Accordingly, only a numeral "1" exists as numerals output at a first position indicating an hour at a range of a given area. Numerals "0"–"9" exist as numerals output at a second position indicating hour. Numerals "0"–"6" exist as numerals output at a first position indicating minute. Numerals "0"–"9" exist as numerals output at a second position indicating minute. Only texts of English characters "AM" and "PM" or Korean character "ojeon" and "ohoo" can be output at a position discriminating AM and PM. Accordingly, ten numerals, four English characters or ten numerals and four Korean characters can be detected at a given output area of the text.

Furthermore, the controller 160 can recognize that numeral "1" has the most frequency of texts output at a given area R. Accordingly, the controller 160 may adjust a weight of texts not output at an output area of a digital clock with '0' in entire texts supported by the portable device 100, and provide the greatest weight to "1" among output numerals of a corresponding area. In particular, the controller 160 may apply a weight with respect to "1" by outputting only "1" at a first position outputting hour. In this manner, the controller 160 may apply a weight to output areas of the digital clock based on a type of texts and frequency information of the texts. Meanwhile, the controller 160 may obtain an edge probability that a corresponding pixel is an edge area of a specific output text when the specific pixel is output at the specific pixel by calculating range information through the edge detection and Gaussian filtering. Accordingly, as illustrated in Equation 5, the controller 160 may additionally apply an edge probability of a text acquired based on an edge probability of a pixel and an output frequency of a pixel as a weight in FIG. 2 to select an expression value of the text capable of clearly indicating an edge area.

Figure 6:
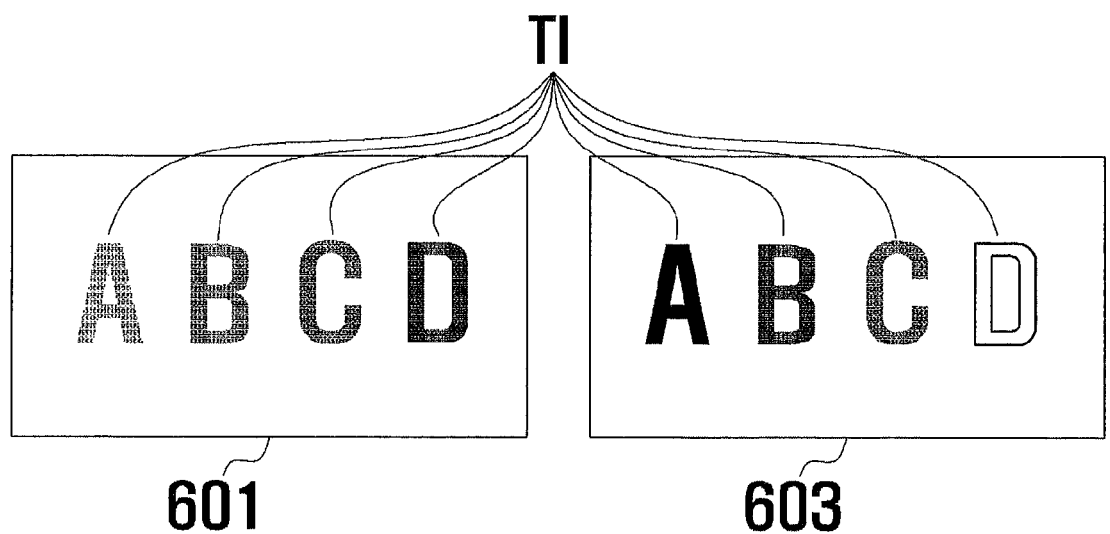
FIG. 6 illustrates a process for automatically selecting an expression value of a screen configuration element according to an embodiment of the present invention.

FIG. 6 illustrates when lightness (brightness or contrast) is applied as an expression value in an automatic selection function of an expression value according to an embodiment of the present invention.

Referring to FIG. 1 and FIG. 6, the controller 160 of the present invention may select an expression value of a text based on lightness information unlike an application of RGB as mentioned above. As illustrated in a screen 601, when each lightness of texts TI output on a specific background image BI of the display unit 140 is set to be low, the controller 160 sets brightness of texts TI higher to have more clear information recognition in comparison with background images BI as illustrated in a screen 603. Texts TI are buried in a background image BI on the screen 601 such that the letter "A" cannot be easily recognized. Upon careful observing letters "B" and "C", a user can recognize information of a corresponding text. At this time, in a screen 603, the controller 160 may increase or decrease lightness of a corresponding text to increase a brightness difference (or contrast) between a background image BI and a text TI, thereby improving information recognition of the text TI. The brightness value can be extracted by converting color coordinate information $X_p$ of an RGB pixel in which a background image BI and a text TI expressed with RGB are output into brightness, for example, HIS (Hue, Intensity, Satuation) or YUV. The brightness information acquired by conversion to HIS or YUV can be applied in place of color information in Equation 1, 2, and 4.

An automatic selection function of an expression value of a screen configuration element according to an embodiment of the present invention is applicable to an image or an icon of a given pattern as well as a text. Namely, when an icon or an image is output at an upper layer in a state that a background image is output at a lower layer, the controller 160 may automatically select an expression value of an icon or an image capable of clearly displaying an edge area.

$$\hat{C} = \underset{C(X_p)}{\operatorname{argmax}} \frac{1}{|R|} \sum_{p \in R} b(X_p) P(|I(X_p) - C(X_p)|, k) \quad \text{[Equation 6]}$$

In Equation 6, $b(X_p)$ is a probability that a specific pixel coordinates $X_p$ is an edge of an icon or an image, $I(X_p)$ is expression value information of a background image, and $C(X_p)$ is expression value information of an icon or an image. Referring to FIG. 6, the controller 160 may obtain a weight with respect to an edge area of icons or images at a given output area of an icon or an image as illustrated in FIG. 5, extract the greatest value among sums of squares of values obtained by subtracting expression value information of a corresponding background image and expression value information of corresponding icon or image from the weight, and determine expression value of used $C(X_p)$ as an expression value of a corresponding image or icon. Here, k may become a preset reference value, and can be set to compensate for a color difference less than −k or greater than k such that an image or an icon is not assimilated with a background image.

As illustrated earlier, an automatic selection function of an expression value of a screen configuration element output on a background image according to an embodiment of the present invention may determine an expression value including at least one of color or lightness (or contrast) to be most clearly viewed upon displaying a text, an image, or an icon over a specific background image. Accordingly, the portable device of the present invention may output a screen configuration element with a suitable expression value regardless of an output position of a background image or the screen configuration element.

The foregoing portable device 100 may include a near distance communication module for near distance communication, a camera module photographing still/moving images of a subject, an interface unit for performing data transmission and reception by a wired communication scheme and a wireless communication scheme of the portable device, an Internet communication module communicating with an Internet to perform an Internet function, and a digital broadcast module performing digital broadcast receiving and playing functions besides the foregoing structural elements according to a provided form. Because the structural elements can be modified according to trends for digital devices, all elements cannot be described. Structural elements equivalent to the foregoing structural elements can be included in the portable device 100. In the portable device 100 of the present invention, specific elements can be excluded from the described structural elements according to a provided form or substituted by other elements. This will be easily appreciated by a person having ordinary skill in the art.

Furthermore, the portable device 100 according to an embodiment of the present invention may include any device capable of outputting a screen configuration element on a background image. For example, the portable device 100 may include all kinds of information and communication devices and multi-media devices such as Portable Multimedia Player (PMP), digital broadcast player, Personal Digital Assistant (PDA), music player (e.g., MP3 player), portable game terminal, wired and wireless telephone, Smart Phone, and applications thereof as well as all mobile communication terminals operating based on communication protocols corresponding to various communication systems.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A method comprising:
    obtaining a background image to be displayed via a display operatively coupled to an electronic device;
    identifying an expression value for at least one portion of the background image corresponding to one or more objects to be displayed via the display, the expression value indicating at least one of a color, a lightness, or a contrast for the at least one portion; and
    based at least in part on a determination that the expression value corresponds to a first expression value or a second expression value, displaying at least one portion of the one or more objects using a corresponding one of a first value or a second value, the first value automatically determined according to the first expression value and the second value automatically determined according to the second expression value, each of the first and second values indicating at least one of the color, lightness, or contrast for the one or more objects.

2. The method of claim 1, wherein the at least one portion comprises a first area corresponding to the first value and a second area corresponding to the second value, wherein the one or more objects comprise a first object corresponding to the first area and a second object corresponding to the second area, and wherein the displaying includes displaying the first object using the first value and displaying the second object using the second value concurrently.

3. The method of claim 1, further comprising:
    based at least in part on a determination that the one or more objects are transformed to another object, displaying at least one portion of the other object using a same value to a corresponding one of the first value or the second value used for the one or more objects.

4. The method of claim 3, wherein the at least one portion of the other object is displayed in the at least one portion of the background image.

5. The method of claim 1, further comprising:
    displaying another object in a first layer different from a second layer in which the one or more objects are displayed.

6. The method of claim 5, wherein the displaying of the other object comprises:
    based at least in part on a determination that one or more portions of the other object corresponds to the at least one portion corresponding to one or more objects, displaying the one or more portions of the other object using another value determined according to a corresponding one of the first value or the second value.

7. The method of claim 1, further comprising:
    replacing one or more portions of the background image with another background image in respond to a user input.

8. The method of claim 7, wherein the replacing comprises:
    automatically presenting the one or more objects using another value determined based on another expression value corresponding to at least a portion of the other background image.

9. The method of claim 1, further comprising:
    presenting an application executing in the electronic device as the one or more objects.

10. An apparatus comprising:
    a display configured to display a background image; and
    a controller operatively coupled to the display, the controller configured to:
        obtain a background image;
        identify an expression value for at least one portion of the background image corresponding to one or more objects to be displayed via the display, the expression value indicating at least one of a color, a lightness, or a contrast for the at least one portion; and
        based at least in part on a determination that the expression value corresponds to a first expression value or a second expression value, display at least one portion of the one or more objects using a corresponding one of a first value or a second value, the first value automatically determined according to the first expression value and the second value automatically determined according to the second expression value, each of the first and second values indicating at least one of the color, lightness, or contrast for the one or more objects.

11. The apparatus of claim 10, wherein the at least one portion comprises a first area corresponding to the first value and a second area corresponding to the second value, wherein the one or more objects comprise a first object corresponding to the first area and a second object corresponding to the second area, and wherein the controller is configured to display the first object using the first value and display the second object using the second value concurrently.

12. The apparatus of claim 10, wherein the controller is configured to:
    display another object in a first layer different from a second layer on which the one or more objects are displayed.

13. The apparatus of claim 12, wherein the controller is configured to:
    based at least in part on a determination that one or more portions of the other object corresponds to the at least one portion corresponding to one or more objects, display the one or more portions of the other object using another value determined according to a corresponding one of the first value or the second value.

14. The apparatus of claim 10, wherein the controller is configured to:
    replace one or more portions of the background image with another background image in respond to a user input.

15. The apparatus of claim 14, wherein the controller is configured to:
    automatically present the one or more objects using another value determined based on another expression value corresponding to at least a portion of the other background image.

16. The apparatus of claim 10, wherein the controller is configured to:
    present an application executing in the apparatus as the one or more objects.

17. The apparatus of claim 10, wherein the controller is configured to:
    display the at least one portion of the one or more objects in the color, lightness, or contrast different from that of the background image.

18. The apparatus of claim 10, wherein at least one of the one or more objects is previously set to be displayed based on the background image being displayed, in response to a user input.

19. The apparatus of claim 10, wherein the controller is configured to:
    display at least one of a text, an image, or an icon as the one or more objects.

20. A non-transitory machine-readable storage device storing instructions that, when executed by one or more processors, cause the one or more processors to perform operations comprising:
    obtaining a background image to be displayed via a display operatively coupled to an electronic device;
    identifying an expression value for at least one portion of the background image corresponding to one or more objects to be displayed via the display, the expression value indicating at least one of a color, a lightness, or a contrast for the at least one portion; and
    based at least in part on a determination that the expression value corresponds to a first expression value or a second expression value, displaying at least one portion of the one or more objects using a corresponding one of a first value or a second value, the first value automatically determined according to the first expression value and the second value automatically determined according to the second expression value, each of the first and second values indicating at least one of the color, lightness, or contrast for the one or more objects.

* * * * *